United States Patent [19]

Wolters, Jr. et al.

[11] 4,357,298

[45] Nov. 2, 1982

[54] NUCLEAR FUEL ASSEMBLY SPACE ARRANGEMENT

[75] Inventors: Richard A. Wolters, Jr.; Tommy C. Lee; Bruce Matzner, all of San Jose, Calif.

[73] Assignee: General Electric Company, San Jose, Calif.

[21] Appl. No.: 195,877

[22] Filed: Oct. 10, 1980

[51] Int. Cl.³ .............................................. G21C 3/18
[52] U.S. Cl. ................................. 376/441; 376/370; 376/438; 376/442
[58] Field of Search ............... 376/441, 439, 442, 438, 376/370, 374, 375, 377

[56] References Cited

U.S. PATENT DOCUMENTS 3,654,077  4/1972  Lass et al. ........................... 376/442
4,190,494  2/1980  Olsson ................................. 376/442

FOREIGN PATENT DOCUMENTS 1480649  7/1977  United Kingdom .

Primary Examiner—Harvey E. Behrend
Attorney, Agent, or Firm—Ivor J. James, Jr.; Samuel E. Turner; Raymond G. Simkins

[57] ABSTRACT

Advantage is taken of the non-uniform axial neutron flux density distribution in a nuclear reactor core by using fuel rod spacers of low neutron absorption in high neutron flux density regions and fuel rod spacers of low coolant flow resistance in the lower neutron flux density regions of the core, this spacer combination also providing higher fuel bundle thermal limits.

13 Claims, 6 Drawing Figures

NUCLEAR FUEL ASSEMBLY SPACE ARRANGEMENT

BACKGROUND

Nuclear power reactors are well known and are discussed, for example, by M. M. El-Wakil in "Nuclear-Power Engineering" McGraw-Hill Book Company Inc., 1976.

In a known type of nuclear power reactor, for example, as used in the Dresden I reactor of the Dresden Nuclear Power Station near Chicago, Ill., the reactor core is of the heterogenous type. In such reactors the nuclear fuel comprises elongated rods formed of sealed cladding tubes of suitable material, such as zirconium alloy, containing uranium oxide and/or plutonium oxide as the nuclear fuel, for example, as shown in U.S. Pat. No. 3,365,371. A number of such fuel rods are grouped together and contained in an open-ended tubular flow channel to form a separately removable fuel assembly or bundle as shown, for example, in U.S. Pat. No. 3,431,170. A sufficient number of fuel assemblies are arranged in a matrix, approximating a right circular cylinder, to form the nuclear reactor core capable of self-sustained fission reaction. The core is submerged in a fluid, such as light water, which serves both as a coolant and as a neutron moderator.

A typical fuel assembly is formed by an array of spaced fuel rods supported between upper and lower tie plates, the rods being several feet in length, on the order of one-half inch in diameter and spaced from one another by a fraction of an inch. To provide proper coolant flow past the fuel rods it is important to maintain the rods in spaced position and restrain them from bowing and vibrating during reactor operation. A plurality of fuel rod spacers spaced along the length of the fuel assembly are provided for this purpose. A variety of such fuel rod spacers have been proposed and used.

Design considerations of such fuel rod spacers include the following: retention of rod-to-rod spacing; retention of fuel assembly shape; allowance for fuel rod thermal expansion; restriction of fuel rod vibration; ease of fuel bundle assembly; minimization of contact areas between the spacer and fuel rods; maintenance of structural integrity of the spacer under normal and abnormal (such as seismic) loads; minimization of reactor coolant flow distortion and restriction; maximization of thermal limits minimization of parasitic neutron absorption; minimization of manufacturing costs including adaptation to automated production. Thus the need to provide such fuel rod spacers creates several significant problems three of which are parasitic neutron absorption, thermal limits and coolant flow restriction or pressure drop.

Any material, in additon to the nuclear fuel, that must be used in the construction of the reactor core unproductively absorbs neutrons and thus reduces reactivity with the result that an additional compensating amount of fuel must be provided. The amount of such parasitic neutron absorption is a function of the amount of the non-fuel material, of its neutron absorption characteristics, that is, its neutron absorption cross section, and of the neutron flux density to which it is exposed.

To remove the heat from the nuclear fuel, pressurized coolant is forced through the fuel assemblies of the reactor core. The fuel rod spacers in the assemblies act as coolant flow restrictors and cause an undesirable though inevitable coolant flow pressure drop. To maintain proper cooling of the fuel rods along their length and to minimize the required coolant pumping power it is desirable that spacer coolant flow restriction be minimized. The flow restriction of a spacer is a strong function of its projected or "shadow" area. Therefore, the flow restriction of a spacer can be minimized by minimizing the projected area of the structure of the spacer. Tests have shown that spacers employing minimized projected area also have the highest thermal limits.

As a practical matter the desire to minimize both parasitic neutron absorption and coolant flow restriction presents a conflict in fuel rod spacer design.

To minimize coolant flow restriction, spacer members must be thin and of minimal cross section area. However, such thin members must be formed of high strength material having suitable resiliency characteristics. It is found that suitable such materials have relatively high neutron absorption characteristics.

On the other hand, materials of desirably low neutron absorption characteristics are found to be of relatively low strength, difficult to form and lacking the resiliency desired for the spring member portions of the spacer.

The foregoing design conflict has resulted in two distinguishably different approaches to spacer design. A first design approach is a "composite" spacer formed of relatively large structural members from a material having a low neutron absorption cross section and fitted with separately formed spring members of suitably resilient material whereby the amount of high neutron absorption cross section material is minimized. This first type of spacer thus provides minimal neutron absorption but relatively high coolant flow resistance.

A second design approach is a spacer with a highly skeletonized structure using a minimum of a high strength material of suitable resiliency but having a higher neutron absorption cross section. This second type of spacer thus provides minimal coolant flow resistance but at the expense of higher neutron absorption.

The composite type of spacer is exemplified, for example, by the disclosure of U.S. Pat. No. 3,654,077. The skeletonized type of spacer is exemplified, for example, by the disclosures of British Pat. No. 1,480,649 and U.S. Pat. No. 4,190,494.

An object of the invention is to improve nuclear reactor performance by a spacer arrangement which provides an advantageous compromise between reducing parasitic neutron absorption and minimizing coolant flow restriction thereby maximizing both thermal limits and pressure drop performance.

Another object is a spacer arrangement which takes advantage of the different neutron flux density regions of a boiling water nuclear reactor.

SUMMARY

In a water cooled and moderated reactor the thermal neutron flux density is less in the upper, as compared to the lower, region of the core because of the decreased density of the water as it is heated in its passage through the core. In a boiling water reactor this effect is pronounced because of the boiling in the upper region of the core.

In accordance with the spacer arrangement of this invention composite spacers of relatively low neutron absorption are used in the high neutron flux density region of the core (i.e. in the lower portion) while skeletonized spacers providing relatively low coolant flow resistance are used in the lower neutron flux density region of the core (i.e. in the upper portion) where their higher neutron absorption cross section is of less consequence.

DRAWING

The invention is described more specifically hereinafter with reference to the accompanying drawing wherein.

DESCRIPTION

Figure 1:
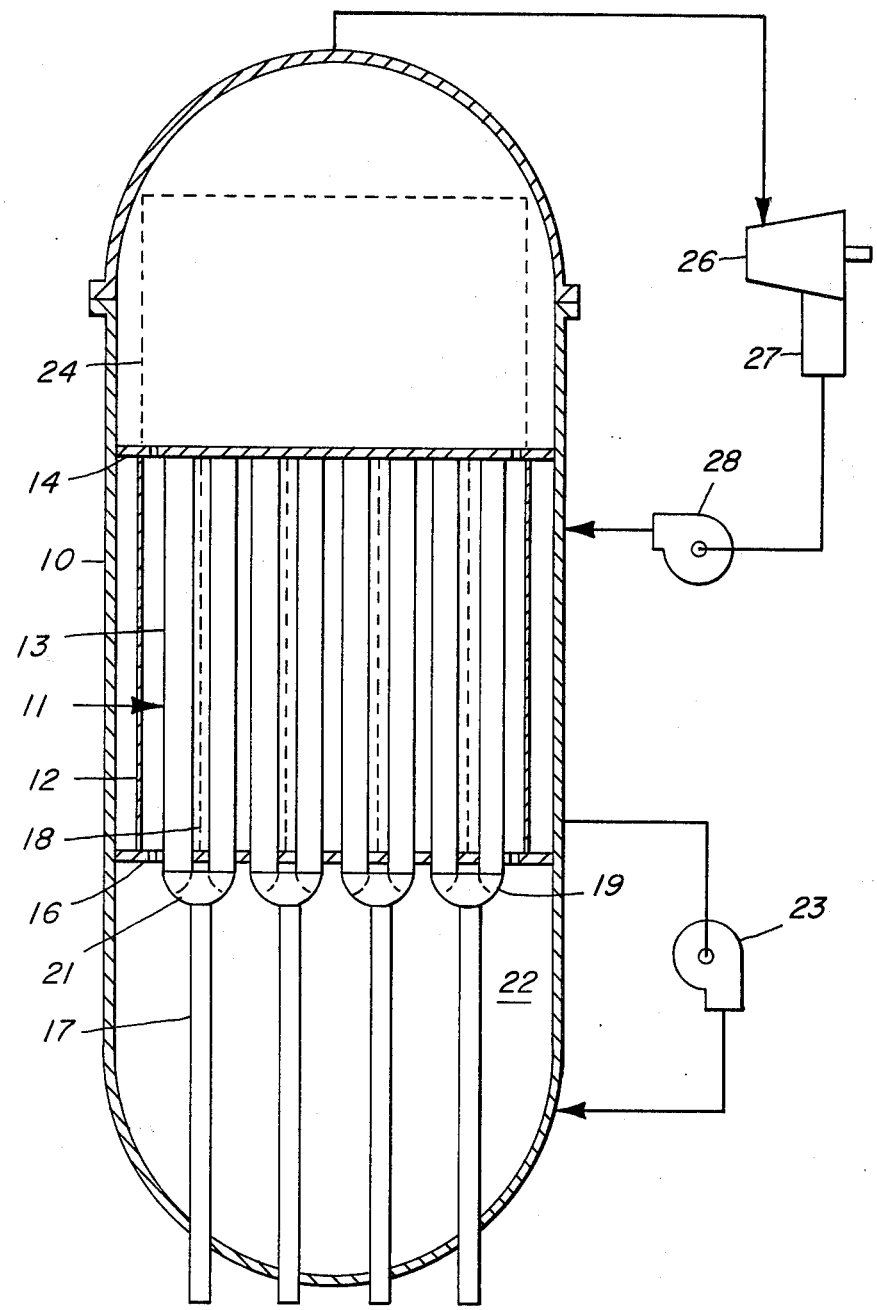
FIG. 1 is a schematic illustration of a boiling water nuclear reactor.

The invention is described herein as employed in a water cooled and moderated nuclear reactor of the boiling water type, an example of which is illustrated in simplified schematic form in FIG. 1. Such a reactor system includes a pressure vessel 10 containing a nuclear reactor core 11 submerged in a coolant-moderator such as light water. The core 11, which is surrounded by an annular shroud 12, includes a plurality of replaceable fuel assemblies 13 arranged in spaced relation between an upper core grid 14 and a lower core plate 16.

A plurality of control rod drive housing tubes 17 house control rod drives by which a plurality of control rods 18 are selectively insertable among the fuel assemblies 13 for control of the reactivity of the core. Each of the housing tubes 17 is fitted with a fuel assembly support member 19 each of which is formed with sockets for receiving the nose pieces 21 of four adjacent fuel assemblies. The nose pieces 21 and the support members 19 are formed with coolant passages or openings for communication with a coolant supply chamber 22. A coolant circulation pump 23 pressurizes the coolant in the supply chamber 22 from which the coolant is thus forced through the openings in support members 19 and the fuel assembly nose pieces upward through the fuel assemblies. A part of the coolant is thereby converted to steam which passes through a separator-dryer arrangement 24 to a utilization device such as a turbine 26. Condensate formed in a condenser 27 is returned as feedwater to the vessel 10 by a pump 28.

Figure 2:
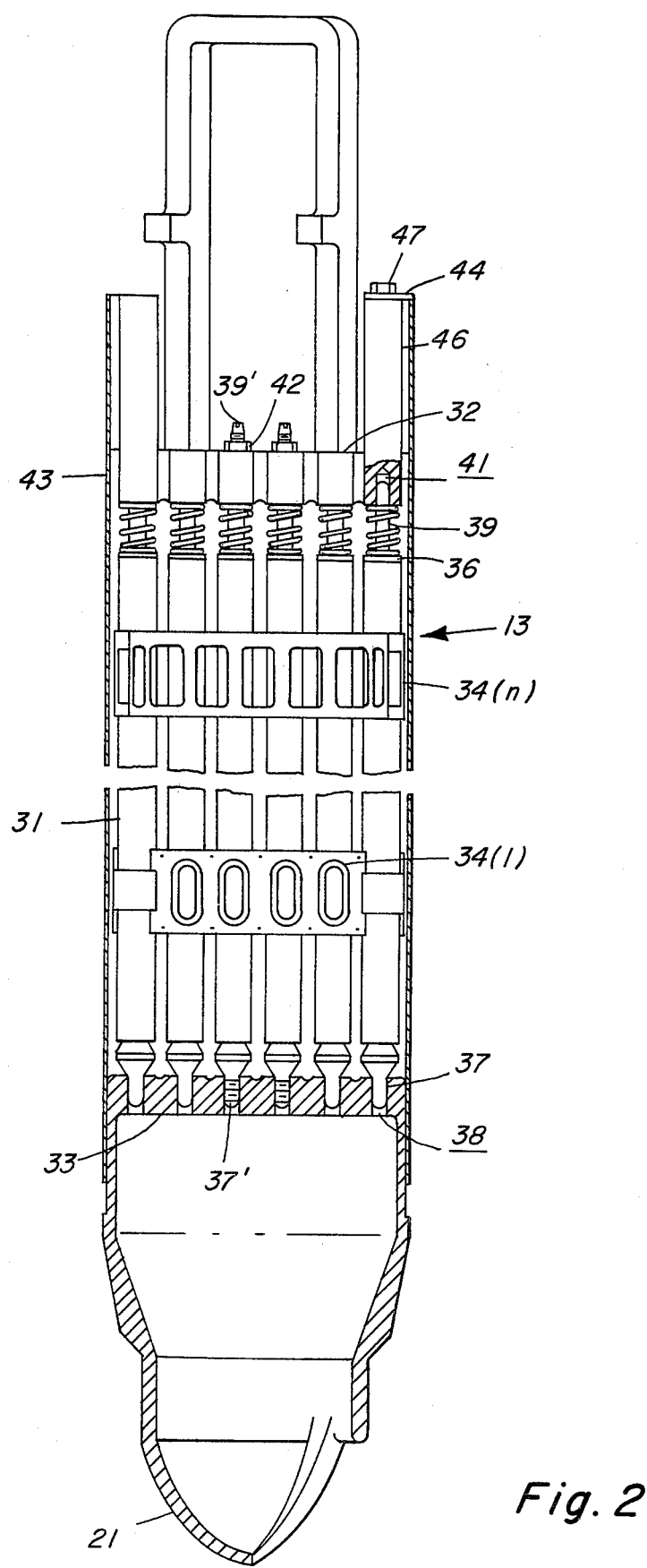
FIG. 2 is an longitudinal section view of a fuel assembly.

A fuel assembly 13 is illustrated in elevation view in FIG. 2. The fuel assembly 13 comprises a plurality of fuel elements or rods 31 supported between a skeletonized upper tie plate 32 and a skeletonized lower tie plate 33. The fuel rods 31 pass through a plurality of fuel rod spacers 34(l)-34(n) which provide intermediate support to retain the elongated rods in spaced relation and restrain them from lateral vibration.

Each of the fuel rods 31 is formed of an elongated tube containing fissile fuel and other materials, such as fertile fuel, burnable poison, inert material or the like, sealed in the tube by upper and lower end plugs 36 and 37. Lower end plugs 37 are formed with extensions for registration and support in support cavities 38 formed in the lower tie plate 33. Upper end plugs 36 are formed with extension 39 which fit into support cavities 41 in the upper tie plate 32.

Several of the support cavities 38 (for example, selected ones of the edge or peripheral cavities) in the lower tie plate 33 are formed with threads to receive fuel rods having threaded lower end plug extensions 37'. Extensions 39' of the upper end plugs of these same fuel rods are elongated to pass through the cavities in the upper tie plate 32 and are formed with threads to receive retaining nuts 42. In this manner the upper and lower tie plates and the fuel rods are formed into a unitary structure.

The fuel assembly 13 further includes a thin-walled tubular flow channel 43, of substantially square cross section, sized to form a sliding fit over the upper and lower tie plates 32 and 33 and the spacers 34(l)-34(n) so that the channel 43 readily may be mounted and removed. Fixed to the top end of the flow channel 43 is a tab 44 by which the channel is fastened to a standard 46 of upper tie plate 32 by means of a bolt 47.

The lower tie plate 33 is formd with a nose piece 21 adapted to support the fuel assembly 13 in a socket of the support member 19 as shown in FIG. 1.

Figure 3:
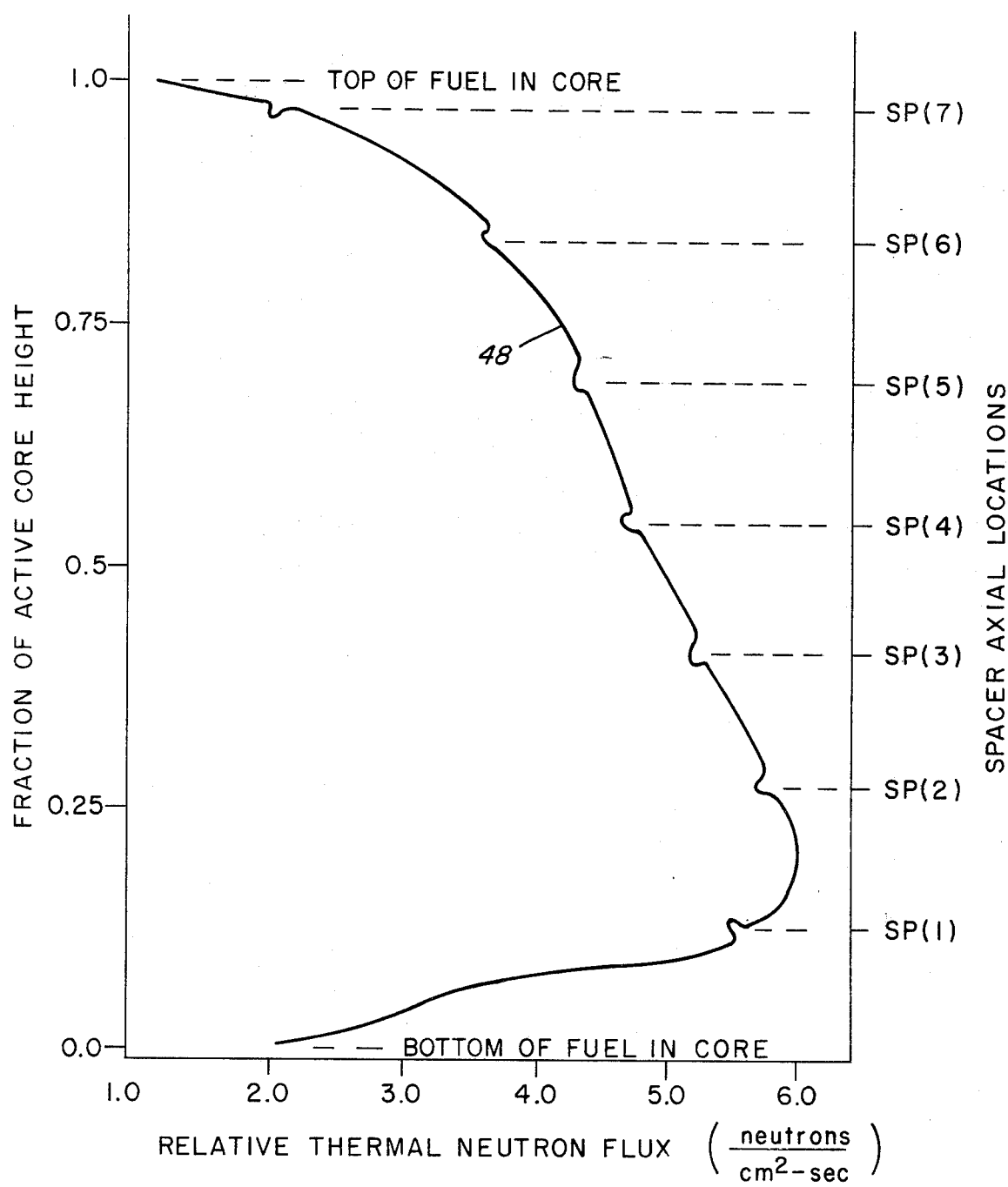
FIG. 3 is a curve illustrating typical axial thermal neutron flux variation in a boiling water nuclear reactor core and also with respect to typical axial locations of the spacers of the fuel assemblies.

Shown in FIG. 3 is curve 48 of the typical axial thermal neutron flux distribution in a boiling water reactor core with respect to the active core height; that is, with respect to the fuel containing portion of the fuel rods of the fuel assemblies.

If the density of the water-moderator were axially uniform, the axial thermal neutron flux distribution would have a cosine shape, that is, maximum at the center and decreasing toward the top and bottom of the core.

However, under actual reactor operating conditions, the water-moderator is heated and becomes less dense (and hence less effective as a moderator) as it flows upward through the fuel assemblies. In a boiling water reactor, the boiling creates a two-phase steam-water mixture in the upper portion of the fuel assemblies with further decreases density and moderation effect. The result is a thermal neutron flux distribution that is peaked toward the bottom of the core as shown by the curve 48.

Also shown in FIG. 3 are the relative axial locations Sp(1)-Sp(7) of the seven fuel rod spacers used in the fuel assembly 13 of the illustrative example. It is noted that the positions of the spacers are evident from the local "dips" in the flux density curve 48 caused by the neutron absorption by the spacers.

In accordance with the invention, low neutron absorption (composite) spacers are used in the lower three or four spacer positions while low flow resistance (skeletonized) spacers are used in the upper three or four spacer positions.

Figure 4:
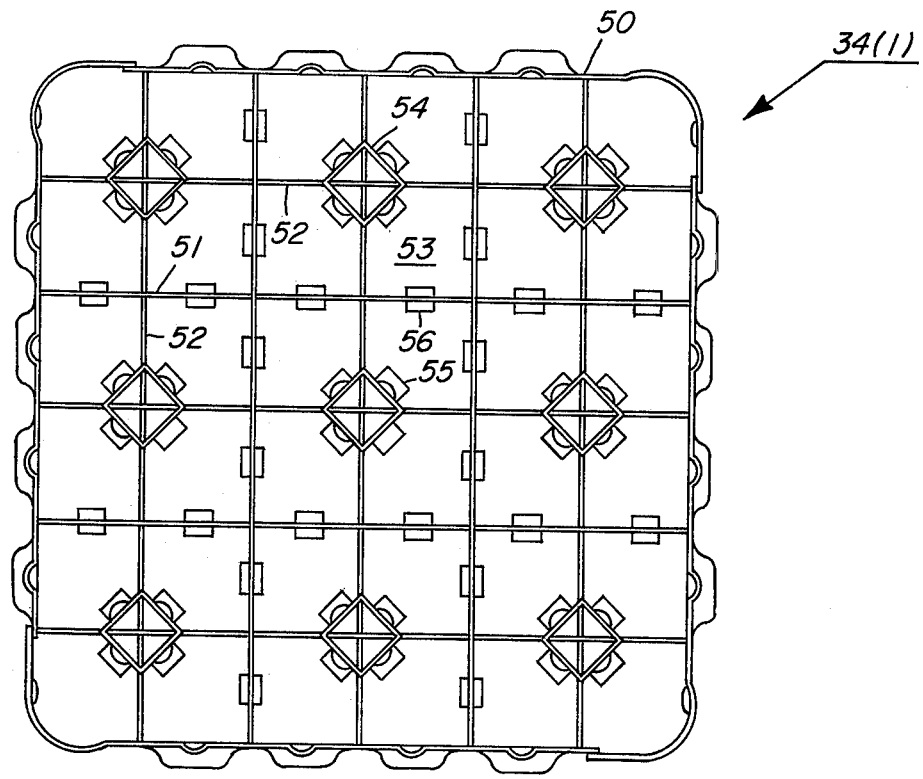
FIG. 4 is a plan view of a spacer of the composite type.

A suitable fuel rod spacer of the composite type, illustrated in FIG. 4 as spacer 34(l), includes a peripheral band 50 supporting a plurality of cross-laced divider members, including divider members 51 and spring support divider members 52, spaced to form a plurality of fuel rod passages or cells 53. Supported at intersections of the divider members 52 are four-sided box spring assemblies 54 with outwardly extending V-shaped spring members 55 extending into the passages 53 whereby the fuel rods are urged into contact with oppositely positioned, relatively rigid projections 56 formed in the divider members 51.

The structural members of the spacer 34(1) are formed of a material having a low neutron absorption cross section such as a zirconium alloy, for example, Zircaloy-4. The spring members 54 are formed of a material having suitable strength and resiliency characteristics such as a nickel alloy, for example, Inconel.

A composite spacer of the type shown in FIG. 4 is described in greater detail in the previously mentioned U.S. Pat. No. 3,654,077 which is incorporated herein by reference.

Figure 5A:
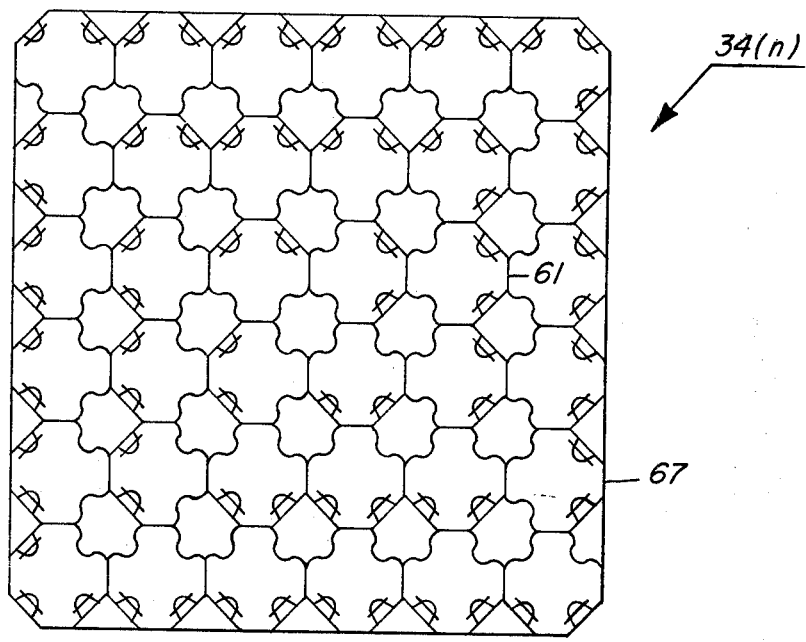
FIG. 5A is a plan view of a low pressure drop skeletonized spacer.
Figure 5B:
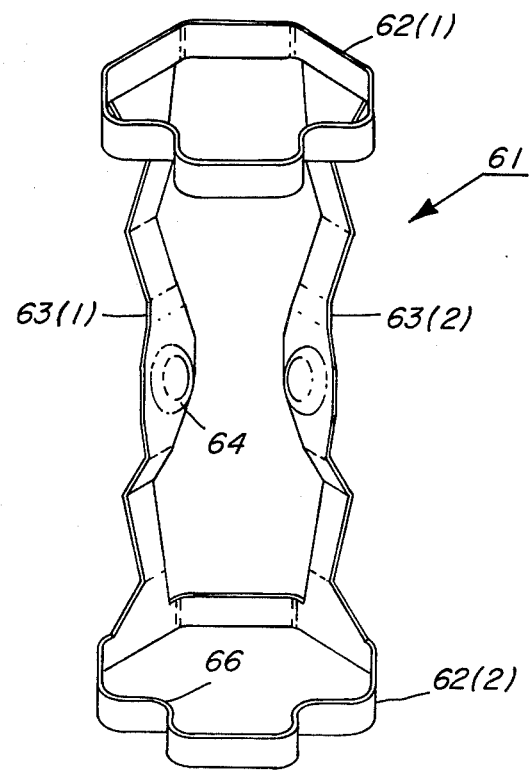
FIG. 5B is an isometric view of the cells which form the spacer of FIG. 5B.

A suitable fuel rod spacer of the low flow resistance skeletonized type is illustrated as a spacer 34(n) in FIG. 5A. The spacer 34(n) is formed of a plurality of cells 61 (each for receiving a fuel rod therethrough) which are assembled in an array and welded together. One of the cells 61 which make up the spacer 13(n) is illustrated in FIG. 5B.

The cell 61 is formed, for example, from a stamping from sheet metal which is then bent into the configuration shown. As thus shaped, the cell 61 includes a pair of axially aligned polygonal sleeves 62(1) and 62(2) joined together in axially spaced apart relation by a pair of laterally spaced spring members 63(1) and 63(2) having a generally W shape extending into the fuel rod passage of the cell.

At their apexes the spring members 63(1) and 63(2) are formed with bosses or protuberances 64 for limiting contact area with the fuel rod in the cell. The lateral spring force of the spring members 63(1) and 63(2) on the fuel rod biases the fuel rod into contact with relatively rigid protuberances 66 formed in the sleeves 62(1) and 62(2) in the sides of the cell opposite the springs.

The spacer 34(n) formed by the welded-together cells 61 can be strengthened by the addition of skeletonized peripheral plate members 67 welded to the sleeves of the peripheral cells.

Since the spring members 63(1) and 63(2) are integrally formed, the entire spacer structure is formed of a material having suitable resiliency characteristics. A suitable such material is a nickel alloy such as Inconel.

A spacer of the skeletonized type as illustrated in FIGS. 5A and 5B is described in greater detail in the previously mentioned British Pat. No. 1,480,649 and U.S. Pat. No. 4,190,494 which are incorporated herein by reference.

In accordance with a preferred form of the invention as applied in a boiling water reactor, spacers of the low neutron absorption composite type (FIG. 4) are used in the high neutron flux region of the core, namely, in spacer locations Sp(1), Sp(2) and Sp(3) while skeletonized spacers of low coolant flow resistance (FIG. 5A) are used in the lower neutron flux region, namely, in spacer locations Sp(5), Sp(6) and Sp(7). Either type of spacer may be used in the center spacer location Sp(4) since there is no predominate advantage to the use of one type over the other in the intermediate neutron flux density at this position.

Consideration of practical examples of the skeletonized and composite spacers indicates that the skeletonized spacer has a relative neutron absorption cross section about 10 times greater than the composite spacers. The consequence of this is that the reactivity penalty from use of composite spacers at all seven spacer locations would be about 50 percent of the reactivity penalty that would be incurred if the skeletonized spacers were used in all locations.

On the other hand flow tests indicate that coolant flow pressure drop through the fuel assembly is decreased by about 20 percent and thermal limits are increased as much as 19 percent by use of skeletonized spacers at all locations as compared to the pressure drop and thermal limits resulting from use of composite spacers at all locations.

By use of the spacer arrangement of the invention, coolant flow pressure drop is decreased in the order of 15 percent and thermal limits in the order of 10 percent while the reactivity penalty is increased by only about 20 percent (as compared to the case of all spacers being of the composite type).

We claim:

1. A fuel assembly for use with a plurality of fuel assemblies and a neutron moderator fluid circulating through said fuel assemblies in a nuclear reactor core wherein the neutron flux density varies from relatively low neutron flux densities toward the ends of said core to a higher neutron flux density intermediate the ends of said core, said fuel assembly comprising: a plurality of elongated fuel elements; means for holding said fuel elements in a spaced array; a plurality of fuel element spacers in axially spaced locations along said fuel assembly for laterally supporting said fuel elements, said spacers being of first and second types, said first type of spacers having a relatively low neutron absorption cross section but presenting a relatively high neutron moderator fluid flow resistance, said second type of spacer having a higher neutron absorption cross section but presenting a lower neutron moderator fluid flow resistance, the spacers of said first type being axially located along said fuel assembly in regions of highest neutron flux density and the spacers of said second type being axially located along said fuel assembly in regions of lower neutron flux density.

2. A fuel assembly for use with a plurality of fuel assemblies and a water moderator-coolant in the core of a boiling water reactor having means for directing a flow of said coolant-moderator through said fuel assemblies, said fuel assembly comprising: a plurality of fuel element spacers in axially spaced locations along said fuel assembly for laterally supporting said fuel elements, said spacers being of first and second types, said first type of spacers having a relatively low neutron capture cross section but presenting a relatively high coolant-moderator flow resistance, said second type of spacers having a neutron absorption cross section higher than the spacers of said first type but presenting a coolant-moderator flow resistance lower than the spacers of said first type, the spacers of said first type being axially located along said fuel assembly predominately in regions of highest neutron flux density and the spacers of said second type being axially located along said fuel assembly predominately in regions of lower neutron flux density.

3. The fuel assembly of claim 2 wherein said first type of spacers is formed predominately from a zirconium alloy and wherein said second type of spacer is formed predominately from a nickel alloy.

4. The fuel assembly of claim 2 having seven spacers, the lower four spacers being of said first type and the upper three spacers being of said second type.

5. The fuel assembly of claim 2 having seven spacers, the lower three spacers being of said first type and the upper four spacers being of said second type.

6. The fuel assembly of claim 2 having seven spacers, the lower three spacers and the top most spacer being of said first type and the remaining three spacers being of said second type.

7. A fuel assembly for use with a plurality of fuel assemblies and a water coolant-moderator circulating through said fuel assemblies in the core of a boiling water reactor wherein during operation of said reactor said water is a two-phase mixture of vapor and liquid in an upper boiling region of said core where thermal limits are generally reached first and a single-phase liquid in a lower non-boiling region of said core where thermal limits are generally never exceeded, said fuel assembly comprising: a plurality of elongated fuel elements; means for holding said fuel elements in a spaced array including a plurality of fuel elements in axially spaced locations along said fuel assembly for laterally supporting said fuel elements, each of said spacers providing a passage for each of said fuel elements and in each of said passages providing a resilient means for engaging said fuel elements, said spacers being of first and second types, said first type of spacers having structural members thereof formed of a material having a relatively low neutron capture cross section, the resilient means of said first type of spacers being formed of a material different from the structural members thereof, said first type of spacers being located along the length of said fuel assembly predominantly in the non-boiling region of said core, said second type of spacers having a highly skeletonized structure to provide minimized coolant-moderator flow pressure drop thereacross, the resilient means of said second type of spacers being formed integral with the structural members thereof, said second type of spacers being located along the length of said fuel assembly predominately in the boiling region of said core.

8. The fuel assembly of claim 7 wherein the structural members of said first type of spacer are formed of a zirconium alloy and the resilient means thereof are formed from a nickel alloy.

9. The fuel assembly of claim 7 wherein said second type of spacers, including the structural members and resilient means thereof, are formed from a nickel alloy.

10. The fuel assembly of claim 7 having seven spacers the lower four spacers being of said first type and the upper three spacers being of said second type.

11. The fuel assembly of claim 7 having seven spacers, the lower three spacers being of said first type and the upper four spacers being of said second type.

12. The fuel assembly of claim 7 having seven spacers, the upper most spacer and the lower three spacers being of said first type and the remaining spacers being of said second type.

13. The fuel assembly of claim 7 wherein the number of spacers of either type is no greater than one more than the number of spacers of the other type.

* * * * *